United States Patent
Tsuge et al.

(10) Patent No.: US 6,967,426 B2
(45) Date of Patent: Nov. 22, 2005

(54) BRUSH SUPPORT JIG USED IN MOUNTING A BRUSH ASSEMBLY OF A ROTARY ELECTRIC MACHINE, AND METHOD OF MOUNTING THE BRUSH ASSEMBLY USING THE BRUSH SUPPORT JIG

(75) Inventors: Takafumi Tsuge, Ena (JP); Hiroaki Ishikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/361,600

(22) Filed: Feb. 11, 2003

(65) Prior Publication Data

US 2003/0160534 A1 Aug. 28, 2003

(30) Foreign Application Priority Data

Feb. 27, 2002 (JP) .............................. 2002-050817

(51) Int. Cl.⁷ .......................................... H02K 13/00
(52) U.S. Cl. ...................................... 310/239; 310/240
(58) Field of Search ................................ 310/239, 240, 310/242

(56) References Cited

U.S. PATENT DOCUMENTS

| 2,780,949 | A | | 2/1957 | Hoy | ............................ 81/486 |
|---|---|---|---|---|---|
| 4,774,754 | A | * | 10/1988 | Stewart, Sr. | .................. 29/596 |
| 5,006,747 | A | * | 4/1991 | Stewart, Sr. | ................. 310/239 |
| 5,089,735 | A | * | 2/1992 | Sawaguchi et al. | ........... 310/88 |
| 5,495,134 | A | * | 2/1996 | Rosenblum | .................. 310/239 |
| 6,333,580 | B1 | * | 12/2001 | Steinbart et al. | ............. 310/239 |

FOREIGN PATENT DOCUMENTS

| JP | 63 310349 | 12/1988 | .......... H02K 13/00 |
|---|---|---|---|
| JP | A 63-310349 | 12/1988 | .......... H02K 13/00 |
| JP | A-7-123649 | 5/1995 | ............ H02K 9/28 |
| JP | A 9-117110 | 5/1997 | .......... H02K 13/00 |

* cited by examiner

*Primary Examiner*—Darren Schuberg
*Assistant Examiner*—Nguyen Hanh
(74) *Attorney, Agent, or Firm*—Oliff & Berridge, PLC

(57) ABSTRACT

A brush support jig for use during mounting of a brush assembly on a rotary electric machine having slip rings, to restrain the brushes against contact with the slip rings during the mounting operation, is of pin configuration having a linear portion formed of a linear portion made of a metal such as steel and a coating portion made of a material such as synthetic resin, having a lower degree of hardness than the slip rings, which covers the linear portion and thereby prevents damage to the slip rings in the event that that brush support jig comes into contact with the slip rings during the mounting operation.

12 Claims, 4 Drawing Sheets

BRUSH SUPPORT JIG USED IN MOUNTING A BRUSH ASSEMBLY OF A ROTARY ELECTRIC MACHINE, AND METHOD OF MOUNTING THE BRUSH ASSEMBLY USING THE BRUSH SUPPORT JIG

BACKGROUND OF THE INVENTION

1. Field of Application

The present invention relates to a brush support jig which is used when mounting the brush assembly of a rotary electric machine, and to a method of mounting a brush assembly by using such a brush support jig.

2. Related Prior Art

In a rotary electric machine having slip rings and brushes which respectively contact the slip rings, such as an AC generator of a motor vehicle, a brush assembly is mounted on the machine, which includes a brush holder for supporting the brushes and also includes a slip ring cover which is of box configuration and which, together with the brush holder, surrounds the peripheries of the slip rings. If there is a defect such as a surface scratch in the slip rings, then this can cause abnormal noise to be generated and can result in shortening of the operating life of the brushes. For that reason, it is important to ensure that no damage occurs to the slip rings when the brush assembly is being mounted.

Various types of brush support jig have been used in the prior art, with the objective of retaining the brushes in such a manner as to prevent damage to the slip rings when the brush assembly is being mounted, i.e., to restrain the brushes against motion towards the slip rings during the mounting operation. An example of this is shown in FIG. 6, in which before the brushes are mounted at the peripheries of the slip rings 134, 135, a brush support jig 151 which is of pin configuration is inserted into the brush holder 127, to prevent the brushes 128, 129 (which are being pushed towards the slip rings by the springs 144, 145 respectively) from flying out. In the following, it should be understood that the term "pin configuration" or "pin-shaped" as applied to a brush support jig is used to signify that the jig is basically of narrow elongated form, having width and depth dimensions which are each substantially smaller than the circumference of the slip rings. With this prior art example, the brush support jig 151 is formed of a wire which is made of a hard material such as steel, with a diameter of approximately 2 mm. A sufficiently large spacing (e.g., approximately 3 mm) is formed between the brush support jig 151 and the slip rings 134, 135 to ensure that the brush support jig 151 will not contact and thereby damage the slip rings during the mounting operation. The brush support jig 151 is supported at support regions that are respectively constituted by a metal member 127a which is mounted centrally in the brush holder 127 and by a hole 102a which is formed in the rear-side frame 102.

In the case of Japanese Patent 63-310349 (1998), an arrangement for preventing the brushes of a rotary electric machine from flying out, when the brush assembly is being mounted on the machine, is implemented by a pin-configuration brush support jig which is inserted into holes respectively formed in the brushes, with the brush support jig being supported at support regions constituted by these holes in the brushes and by a hole which is formed in a rear-side frame of the rotary electric machine. With that prior art example, even if the brush support jig should become tilted, the brushes are effectively prevented from contacting the slip rings.

Furthermore in Japanese Patent 9-117110 (1997), it is proposed to fit a brush support jig which is of tubular configuration (having an inner diameter which is greater than the outer diameter of the slip rings) into the inner periphery of a cylindrical aperture which is formed in the brush holder and in the slip ring cover, so that the brush support jig surrounds the peripheries of the slip rings and thereby restrains the brushes from contacting the slip rings, when the brush assembly is being mounted.

However in the case of the prior art configuration shown in FIG. 6, due to the manner in which the brush support jig is supported, it is necessary for the brush support jig to be of substantially large diameter, in order to have sufficient rigidity to withstand the force exerted by the springs against the brushes (in particular, the spring 144, acting on the brush 128, as can readily be understood from FIG. 6). Thus, the spacing between the slip rings and brush support jig must be relatively large, and hence the overall size of the brush assembly becomes large. For that reason, such a configuration is not suited to the present-day requirements for greater compactness.

In the case of the configuration disclosed in Japanese Patent 63-310349 (1998), in order to prevent the operating life of the brushes from being shortened as a result of the fact that holes must be formed in the brushes, it is necessary to increase the length of the brushes accordingly. For that reason, the brush assembly becomes large in size, so that the present-day requirements for greater compactness cannot be satisfied by such an arrangement.

In the case of the configuration disclosed in Japanese Patent 9-117110 (1997), it is necessary to form a large opening in the brush assembly, adjacent to the outer end of the slip rings, and this opening must be covered by a seal, such as a rubber seal, after the brush assembly has been mounted and the brush support jig has been removed. However due to manufacturing deviations in the shapes of components such as the slip ring cover, the rubber seal may not be pressed evenly around the rim of the slip ring cover, so that an effective seal cannot be ensured. Moreover, due to changes in elasticity which will occur in the rubber seal, the cross-sectional area of a ventilation path which includes the rubber seal may be reduced, so that cooling ventilation of the areas of sliding contact between the slip rings and brushes may become insufficient.

SUMMARY OF THE INVENTION

It is an objective of the present invention to overcome the above problems by providing a brush support jig which enables mounting of a brush assembly to be performed, whereby even if the brush support jig should come into contact with the slip rings, no damage to the slip rings will occur.

It is a further objective to provide a method of mounting a brush assembly by using such a brush support jig.

To achieve the first of the above objectives, according to a first aspect, the invention provides a brush support jig to be utilized when mounting a brush assembly of a rotary electric machine, the brush assembly including brushes which are in sliding contact with the outer peripheries of slip rings which are mounted on the shaft of the rotary electric machine, a brush holder for supporting the brushes with respect to the slip rings, and a slip ring cover which, together with the brush holder, surrounds the outer peripheries of the slip rings, with the brush support jig serving to prevent the brushes from flying out of the brush holder during mounting of the brush assembly, wherein the brush support jig has at least a face thereof, disposed opposite the slip rings, which is formed of a material that has a lower degree of hardness than the slip rings.

As a result, even if the brush support jig should come into contact with the slip rings when the brush assembly is being mounted, the slip rings will not be damaged. Thus, generation of abnormal noise by the rotary electric machine and shortening of the operating life of the brushes, as a result of accidental damage caused during mounting of the brush assembly, can be prevented.

In addition, since the danger of damage to the slip rings by the brush support jig is eliminated, the spacing between the brush holder and the slip rings can be made smaller than has been possible in the prior art. Thus, the brush assembly can be made of compact size.

According to another aspect, the brush support jig is formed of a first body and of a second body which is constituted of a material having a lower degree of hardness than the first body, and the second body is formed at least upon a face of the first body which becomes positioned opposite the slip rings when the brush assembly has been mounted on the rotary electric machine with the brush support jig inserted.

As a result, even if the second body of the brush support jig should be forced into contact with the slip rings as a result of the outward force applied to the brushes by the springs, when the brush assembly is being mounted, no damage will be caused to the slip rings. The first body is preferably formed of metal, and the second body formed of a resin material (where the term "resin material" is used herein with the general significance of a synthetic resin material) or rubber material. Such a configuration can be readily manufactured, e.g., by dipping the first body into liquefied synthetic resin or liquefied rubber material. With the first body formed of metal, it can be high in strength and so can effectively withhold the force applied by the springs and prevent the brushes from flying out, when the brush assembly is being mounted on the rotary electric machine, while there is no danger of damage to the slip rings even if the brush support jig should come into contact with the slip rings during the mounting operation, since the second body is formed of a material having a substantially lower degree of hardness than the slip rings.

Furthermore a brush support jig according to the present invention is basically of pin configuration, so that it is not necessary for a large opening to be formed in the end face of the brush assembly, to accommodate the brush support jig, or for any special arrangement to be provided for sealing off an aperture in the brush assembly which remains after mounting of the brush assembly has been completed and the brush support jig is removed.

According to another aspect, a brush support jig according to the present invention is formed with a pin configuration having a tip portion thereof that is contoured in a U-shaped curve. As a result, there is a reduced danger of damage to the slip rings if the tip portion of the brush support jig should contact the slip rings, for example when the brush support jig is withdrawn from the brush assembly after completion of mounting the brush assembly on the rotary electric machine. Such a shape of the tip portion can be readily implemented by bending a length of wire which is of round cross-section, or by press-shaping sheet metal.

Furthermore in that case, if the tip portion formed with such a shape and is then coated with a resin material or rubber material, the coating of resin material or rubber material will not be readily torn, and no damage will occur to the slip rings if they are touched by the tip portion of the brush support jig.

According to another aspect, a brush support jig according to the present invention is supported at a plurality of support regions which, are formed in the brush holder and in the slip ring cover, and which are oriented mutually parallel and coaxial and aligned in the axial direction (where the term "axial direction" is used herein with the significance of a direction which is parallel to the axis of rotation of the shaft of the rotary electric machine). As a result, the brush support jig can be accurately held in position and effectively supported, so that the requirements for strength and rigidity (and hence, thickness) of the brush support jig can be reduced, while ensuring that the brushes will be prevented from flying out when the brush assembly is being mounted. The plurality of support regions can readily be implemented by a plurality of holes which are formed in the brush holder or the slip ring cover (or both of these) at the time of manufacture. It thereby becomes unnecessary to provide any other means of supporting the brush support jig. It also becomes unnecessary to form holes in the brushes.

According to another aspect, a brush support jig according to the present invention is formed with a limiter portion which limits the extent of insertion of the brush support jig into the brush assembly. Hence, the brush support jig can be accurately inserted into the brush assembly. Furthermore, even if an operator should attempt to insert the brush support jig into the brush assembly to a greater extent than is actually required, this will not result in damage to the brush holder in the brush assembly, or to the slip ring cover, or to the brush support jig itself.

DESCRIPTION OF PREFERRED EMBODIMENTS

Figure 1:
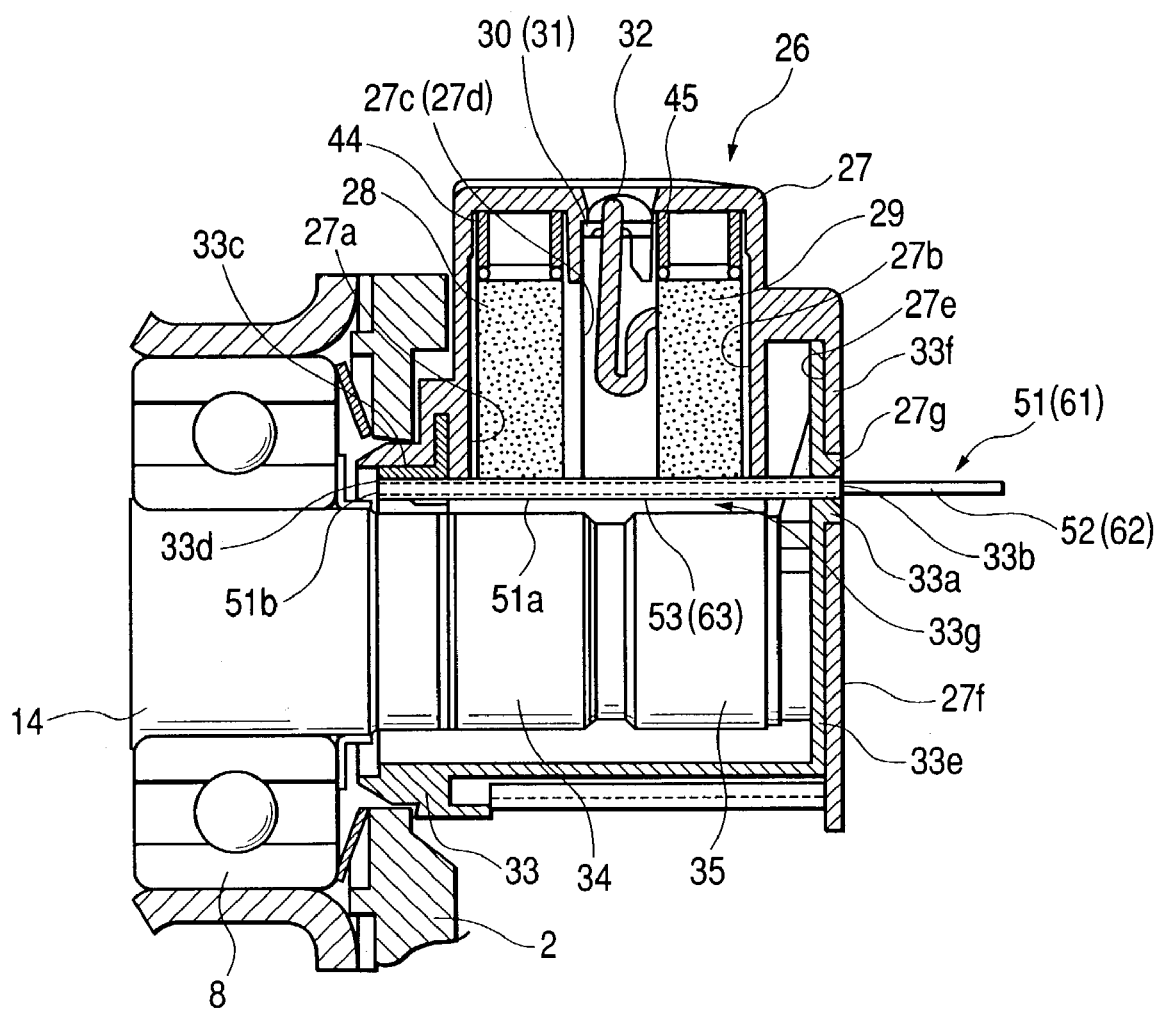
FIG. 1 is an expanded cross-sectional view taken along the axial direction, showing a brush assembly which is mounted on a vehicle AC generator and has a first embodiment of a brush support jig according to the present invention inserted therein.

A first embodiment of a brush support jig according to the present invention will be described in the following referring to FIGS. 1 to 4. FIG. 1 is a partial cross-sectional view taken along the axial direction (where "axial direction" has the significance defined hereinabove) of a vehicle AC generator having a brush assembly mounted thereon, with the first embodiment of a brush support jig inserted into the brush assembly.

As shown in FIG. 1, the brush assembly 26 is made up of a brush holder 27 which is formed of a resin material and has a pair of contact terminals 30, 31 embedded peripherally therein, a pair of brushes 28, 29, pigtails 32 which are connected to the terminals 30, 31, a slip ring cover 33 which is formed of a resin material, and springs 44, 45 which urge the brushes 28, 29 towards slip rings 34, 35 respectively which are mounted on the shaft 14 of the AC generator.

The brush holder 27 is basically in the form of a box, and has brush receptacle portions 27a, 27b, pigtail receptacle portions 27c, 27d and a radially extending groove 27e into which an extension portion 33f of a lid portion 33e of the slip ring cover 33 is inserted, with these being respectively disposed at the end of the brush holder 27 which is adjacent to the slip rings 34, 35, i.e., the rearward end of the brush holder 27. The brush holder 27 further includes a lid portion 27f which seals the rear end of the generator shaft. The pigtails 32 are held in electrical contact with the brushes 28 29 by means of iron powder or iron filings. The terminals 30, 31, which electrically connect the pigtails 32 to external components, are connected by solder to the pigtails 32 and are embedded in the brush holder 27, extending in the radial direction. The brushes 28, 29 are urged towards the slip rings 34, 35 respectively by the springs 44, 45 which are disposed at the rear of the brushes 28, 29.

The brush holder 27 and the slip ring cover 33 are joined together by means of an aperture 27g formed in the lid portion 27f (which seals the rearward end of the generator shaft) of the brush holder 27, and a convex portion 33a formed in the slip ring cover 33, which protrudes in the rearward axial direction and engages in the aperture 27g in the brush holder 27. The term "rearward" as used in this description is to be understood as referring to component positions which are adjacent to the end of the shaft 14 where the slip rings 34, 35 are mounted, while the term "forward" will be used to refer to positions which are on the opposite side of the brush assembly from the "rearward" positions.

A hole 33b extending in the axial direction is formed in the convex portion 33a at the rearward end of the slip ring cover 33. A convex portion 33c is also formed in the forward end of the slip ring cover 33, protruding in the forward axial direction, and a hole 33d is formed in that convex portion 33c, extending in the axial direction, which is coaxial with the hole 33b.

Before the brush assembly 26 is mounted on the AC generator, the brush support jig 51 is inserted into the brush assembly as follows. With the brushes 28, 29 being temporarily pressed back into the receptacle portions 27a, 27b of the brush holder 27, against the force exerted by the springs 44, 45, the brush support jig 51 is oriented with the tip portion 51b thereof adjacent to the aforementioned rearward-end hole 33b in the slip ring cover 33, and with the linear portion 51a of the brush support jig 51 oriented parallel to the axial direction, then the brush support jig 51 is inserted in the axial direction through the hole 33b to pass into a space 33g that is formed in the brush holder 27 and the slip ring cover 33, until the tip portion 51b enters the forward-end hole 33d in the slip ring cover 33. The temporarily depressed condition of the springs 44, 45 is then released, so that the brushes 28, 29 are pushed against the linear portion 51a of the brush support jig 51.

The brush assembly can then be mounted on the AC generator in that condition, with the brush support jig 51 supported in the slip ring cover 33 at support regions provided by the holes 33b and 33d respectively, the brushes 28, 29 in contact with the linear portion 51a of the brush support jig 51, and the brushes 28, 29 thereby held in the brush receptacle portions 27a, 27b of the brush holder 27 and prevented from flying out towards the slip rings 34, 35. The provision of a plurality of supporting regions for the brush support jig by respective ones of a plurality of holes (such as the holes 33b and 33d of this embodiment) is an essential feature of the present invention.

More specifically, the cylindrical-shaped forward end (formed by the brush holder 27 and slip ring cover 33) of the brush assembly 26, with the brush support jig 51 inserted therein, is engaged within a circular aperture in the rearward end of the rear-end frame 2, i.e., a central aperture through which passes the shaft 14, to thereby mount the brush assembly on the vehicle AC generator.

Figure 2:
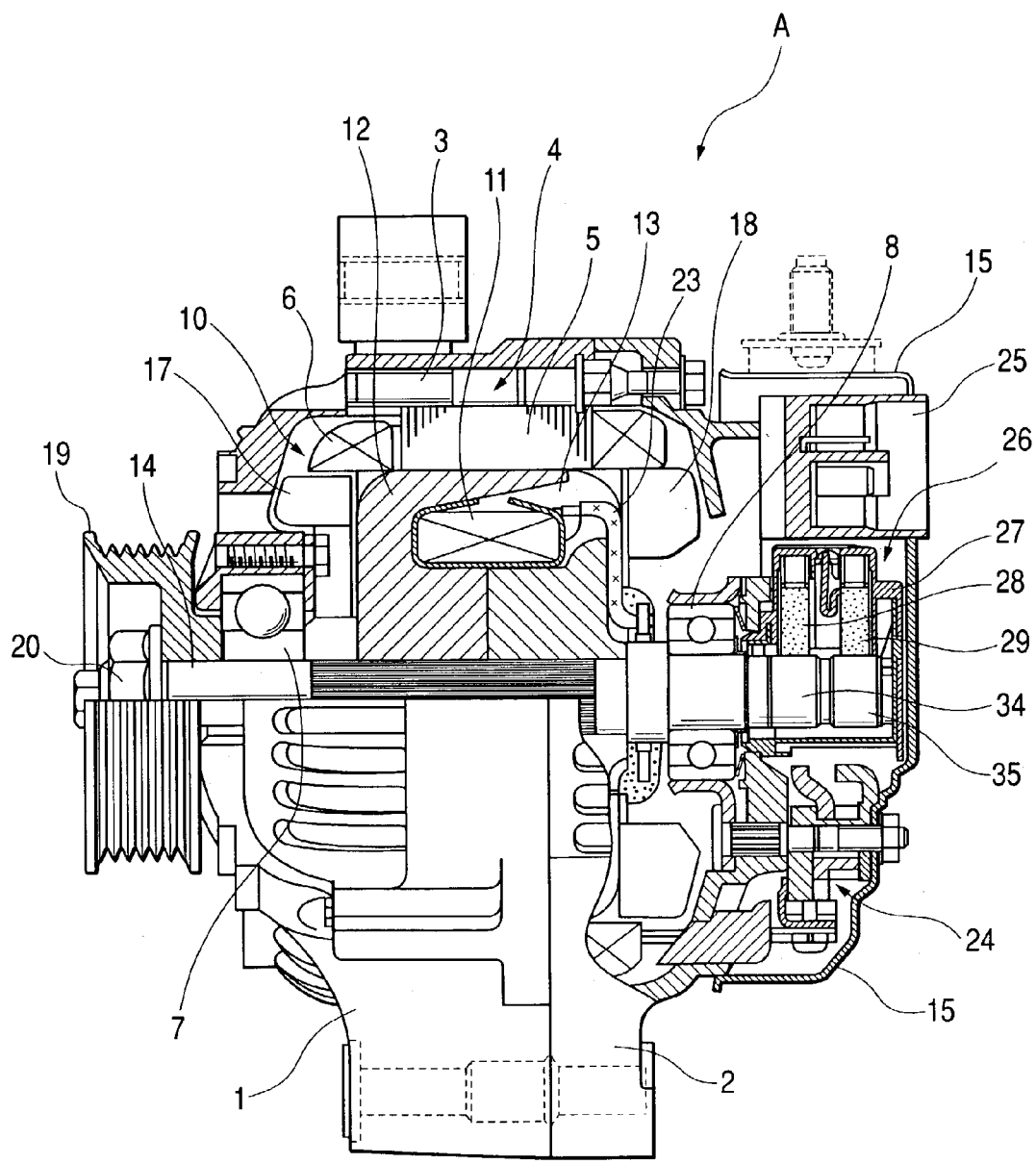
FIG. 2 is a cross-sectional view taken along the axial direction, showing the entire vehicle AC generator of FIG. 1 with the brush assembly mounted thereon and the first embodiment of a brush support jig inserted in the brush assembly.

FIG. 2 is a cross-sectional view taken along the axis of rotation, corresponding to FIG. 1, showing the entire vehicle AC generator, designated by the letter A. The condition is shown in which the brush assembly 26 has been mounted on the vehicle AC generator apparatus A, with the first embodiment of a brush support jig inserted. The front-end frame 1 and the rear-end frame 2 of the AC generator A, each formed of diecast aluminum, are disposed with respective open portions of these in mutual direct contact, attached by a plurality of bolts 3. A stator 4 is attached at the inner periphery of the front-end frame 1. The stator 4 is of known type, formed of a stator core 5 and a stator winding 6.

The rotor 10 is of known configuration, formed of a field winding 11, pole cores 12, 13, shaft 14, etc., and is rotatably supported by a pair of ball bearings 7, 8, which are respectively mounted in the front-end frame 1 and the rear-end frame 2. The radially extending faces of the pole cores 12, 13 have axial type cooling fans 17, 18 mounted thereon. The forward-end cooling fan 17 has the blades thereof oriented with a tilt towards the axis of rotation of the rotor 10, so as to provide an effective flow of cooling air to the field winding 11. The forward end of the shaft 14 has a pulley 19 attached thereto by a nut 20, and is driven to rotation by a vehicle engine (not shown in the drawings). The rearward end of the shaft 14, located external to the rear-end frame 2, has the slip rings 34, 35 mounted thereon, which are electrically connected via conductor elements 23 to the field winding 11.

A rectifier unit 24, a voltage regulator 25, and the brush assembly 26 (i.e., the electrical components) are fixedly attached by bolts to the exterior of the rear end face of the rear-end frame 2, as shown. Electrical components other than those of the brush assembly 26 are covered by a rear cover 15, formed of sheet metal or resin material, in which is formed a ventilation aperture.

Figure 3:
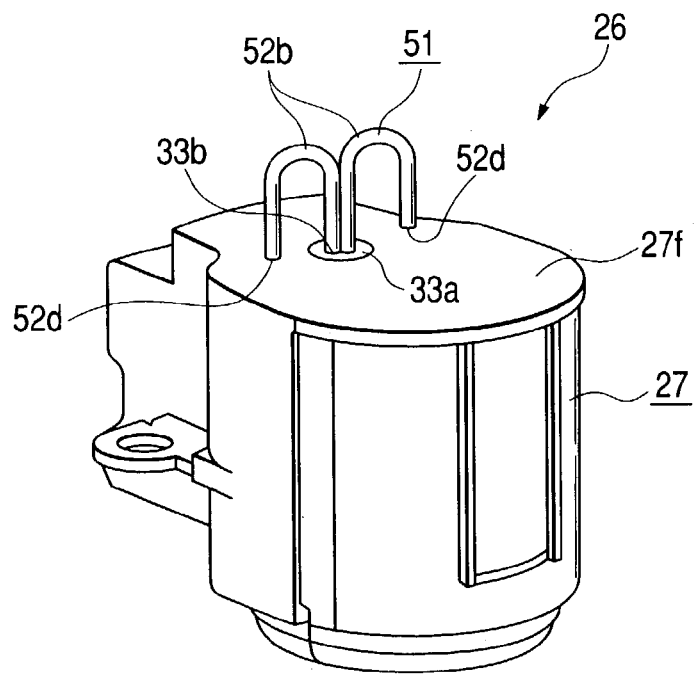
FIG. 3 is an oblique view of the brush assembly, showing the condition with the first embodiment of a brush support jig inserted.
Figure 4:
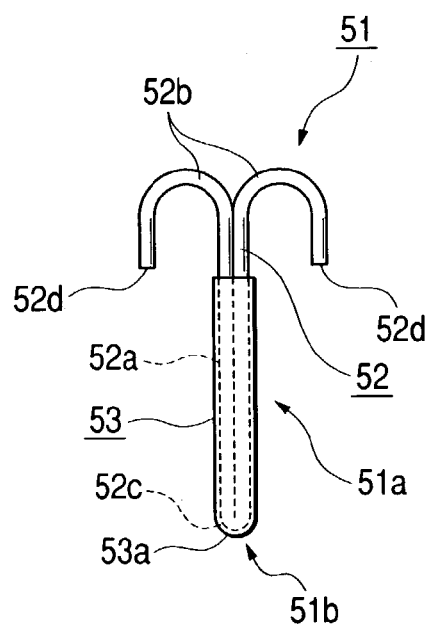
FIG. 4 is a plan view of a first embodiment of a brush support jig.

The brush support jig 51 of this embodiment will be described referring to FIGS. 3 to 4. FIG. 3 is an oblique view of the brush assembly 26, with the brush support jig 51 in the inserted condition. FIG. 4 is a plan view of the brush support jig 51. The overall shape of the brush support jig 51 is a pin configuration, which in the case of this embodiment is formed of a main body 52 that is made of a metal wire that is round in cross-section, and a coating portion 53 which covers a linear portion 52a (described hereinafter) of the main body 52. The linear portion 52a of the main body 52 and the coating portion 53 which covers the linear portion 52a, in combination, constitute the linear portion 51a of the brush support jig 51. The tip portion of that combination constitutes the tip portion 51b of the brush support jig 51.

The main body 52 is formed of the linear portion 52a and a pair of grip portions 52b. The linear portion 52a is configured approximately in the shape of a hairpin, and is formed by using a press machine to bend a length of wire, which is round in cross-section and of predetermined length, into a shape having two straight portions which are oriented mutually parallel, with the tip portion 52c of the linear portion 52a being bent into a U shape, as shown.

In addition, a coating portion 53 is formed to cover the linear portion 52a, by dipping the linear portion 52a into liquefied resin material to thereby form a coating of the resin material. A covered tip portion 53a is thereby configured in a U shape which follows the shape of the tip portion 52c of the main body. The thickness of the linear portion 51a, including the coating portion 53, is approximately 1.5 mm, and the width is approximately 3 mm (the thickness of the linear portion 52a of the main body 52, when formed of wire which is round in cross-section, is typically approximately 1 mm, with the width being approximately 2 mm).

The linear portion 51a, formed with the coating portion 53, when inserted into the brush assembly 26, is supported in the holes 33b and 33d in the slip ring cover 33, and bears against the brushes 28, 29, to thereby prevent these from flying out.

A pair of grip portions 52b are formed by separating the two outer end portions of the wire constituting the main body 52, after that has been bent into the shape described above, moving these end portions apart, and bending each of these end portions into a U shape which is of opposite orientation to the U shape of the tip portion 52c of the main body, as illustrated in FIG. 4. The pair of grip portions 52b are grasped by an operator, when inserting or removing the brush support jig 51. In addition, the pair of grip portions 52b of the main body 52 are cut to such a length that the respective tips 52d thereof will contact the lid portion 27f of the brush holder 27 when the brush support jig 51 is inserted along the axial direction of the brush assembly 26 into the hole 33b, to enter the hole 33d. In that way, the extent to which the brush support jig 51 can be inserted is restricted.

The method of mounting the brush assembly 26, using the brush support jig 51 described above, is as follows. Firstly, while depressing the brushes 28, 29 against the urging of the springs 44, 45, the brush support jig 51 is inserted into the brush assembly 26 along the axial direction through the rearward hole 33b, with the insertion being halted when the tips 52d of the grip portions 52b come into contact with the lid member 27f.

When the insertion of the brush support jig 51 has been completed, so that the brush support jig 51 is supported in the holes 33b, 33d in the slip ring cover 33, then since the brushes 28, 29 are prevented by the brush support jig 51 from flying out, a space is provided into which the rearward end of the generator shaft and the slip rings 34, 36 can enter, when mounting the brush assembly 26 on the vehicle AC generator.

Next, the brush assembly 26, with the brush support jig 51 inserted, is fitted over the peripheries of the slip rings 34, 35, and moved towards the forward end of the shaft 14, and is fixedly attached to the rear-end frame 2 after the brushes 28, 29 have attained respective predetermined positions in relation to the slip rings 34, 35. In this condition, there is a small amount of spacing between the brush support jig 51 and the slip rings 34, 35 (i.e., a spacing of approximately 0.8 mm), however even if the brush support jig 51 should touch against the slip rings 34, 35, no damage will be caused to these, due to the coating portion 53 which is formed of resin material on the linear portion 51a of the brush support jig 51.

Next, the brush support jig 51 is withdrawn from the brush assembly 26, along the axial direction, whereby the brushes 28, 29 which had previously been restrained from movement by the brush support jig 51, come into contact with the outer peripheries of the slip rings 34, 35 respectively. Even if the brush support jig 51 should touch against the slip rings 34, 35 while this withdrawal is being performed, no damage will occur, due to the coating portion 53 which is formed of resin material on the linear portion 51a. This completes the mounting operation.

As can be understood from the above description, the effects obtained with the brush support jig 51 are as follows. Due to the fact that the linear portion 51a on the face of the brush support jig 51 that is disposed opposite the slip rings 34, 35 is coated with resin material, having a lower degree of hardness than the slip rings 34, 35, even if the brush support jig 51 should touch the slip rings 34, 35 during the operation of mounting the brush assembly 26 on the vehicle AC generator, no damage to the slip rings 34, 35 will occur. Hence, generation of abnormal noise by the vehicle AC generator A as a result of such damage, or shortening of the operating life of the brushes, can be prevented. Furthermore due to the fact that the spacing between the brush holder 27 and slip rings 34, 35 can be made small, the brush assembly 26 can be made of compact size.

Furthermore, due to the fact that the main body of the brush support jig 51 is in the general shape of a pin, the brush support jig 51 can effectively prevent the brushes 28, 29 from flying out, while at the same time the brush support jig 51 can have a simple configuration and low manufacturing cost. Moreover due to the fact that it is not necessary for a large opening to be formed in the brush assembly at the rear of the slip rings, as is required with a prior art type of brush support jig which is of tubular form and surrounds the peripheries of the slip rings, it is not necessary to make provisions for sealing such an opening after mounting of the brush assembly has been completed and the brush support jig has been removed. Hence, problems which might be caused by an arrangement used to effect such sealing of a large aperture can be avoided.

Moreover, the fact that the coated tip portion 53a of the brush support jig 51 is curved in a U shape further serves to ensure that no damage to the slip rings 34, 35 will occur if the brush support jig 51 should contact the slip rings during mounting of the brush assembly 26 on the vehicle AC generator apparatus, or during subsequent removal of the brush support jig 51 from the brush assembly 26.

Furthermore due to the fact that the tip portion 52c of the brush support jig 51 is made of metal wire which is curved into a U shape, when that tip portion has been coated with a resin material, the tip portion 53a of the resin coating will not be readily damaged. In addition, the resin coating of the tip portion 53a further serves to ensure that no damage to the slip rings 34, 35 will occur if the brush support jig 51 should contact the slip rings during mounting of the brush assembly 26 on the vehicle AC generator apparatus, or during subsequent removal of the brush support jig from the brush assembly 26.

In addition, since the brush support jig 51 passes through a plurality of holes 33b, 33d which are formed in the slip ring cover 33, oriented coaxially and parallel to the axial direction, the brush support jig 51 can be accurately positioned and securely supported, thereby further serving to ensure that the brushes 28, 29 can be effectively prevented from flying out of the brush holder 27 during the operation of mounting the brush assembly 26. Moreover, the holes 33b, 33d can readily be formed at the state of manufacturing the slip ring cover 33, e.g., by a molding process, and it is not necessary to provide any additional members for supporting the brush support jig 51. In addition, it is not necessary to form holes in the brushes for the purpose of supporting the brush support jig, whereby the length of the brushes would have to be increased as described hereinabove. Hence, the brush assembly can be made compact in size.

Moreover since the pair of grip portions 52*b* serve as limiter members, for limiting the extent to which the brush support jig 51 can be inserted into the brush assembly 26, an operator can accurately insert the brush support jig 51 into the brush assembly 26. Furthermore as a result of this limiting function which is provided by the grip portions 52*b*, even if it is attempted to insert the brush support jig 51 into the brush assembly 26 to an excessive extent, no damage will occur to the brush holder 27 or to the slip ring cover 33 or to the brush support jig 51 itself.

Figure 5:
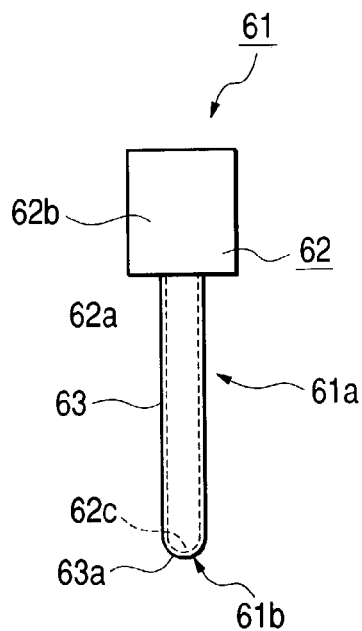
FIG. 5 is a plan view of a second embodiment of a brush support jig.
Figure 6:
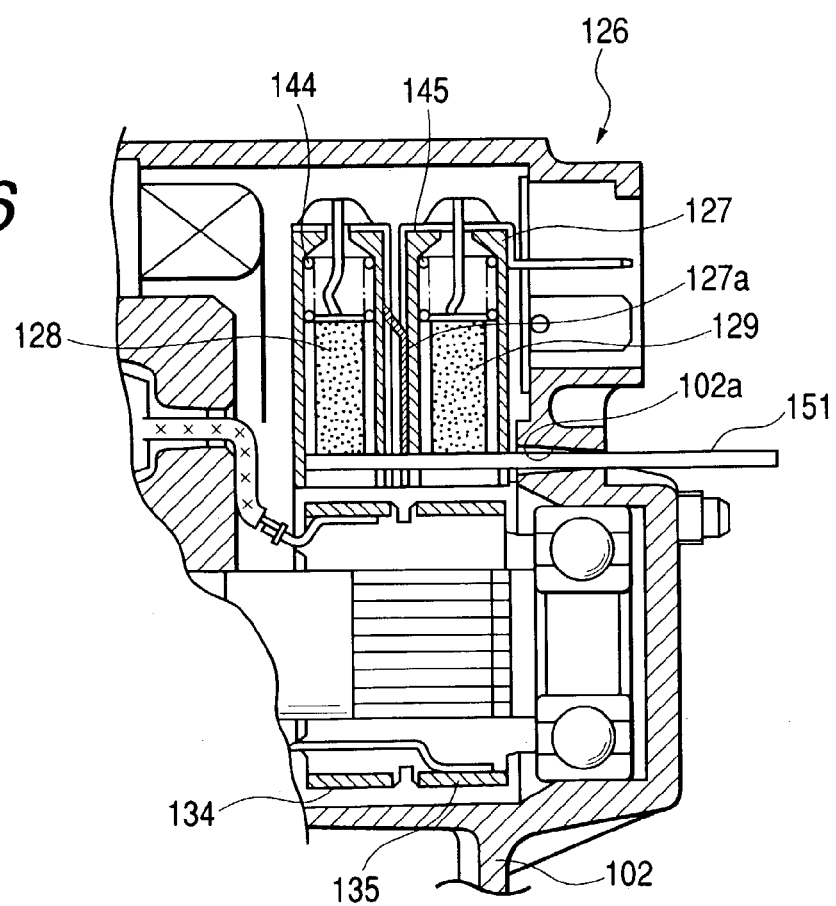
FIG. 6 is an expanded cross-sectional view taken along the axial direction, of the main components of a vehicle AC generator having a brush assembly mounted thereon, with the brush assembly having a prior art example of a brush support jig inserted therein.

A second embodiment of the invention will be described in the following, which is the brush support jig 61 shown in FIG. 5. It should be noted that the condition with the brush support jig 61 inserted into the brush assembly 26 is identical to that illustrated in FIG. 1. The brush support jig 61 is also of pin configuration (as defined hereinabove) as for the brush support jig 51 of the first embodiment. However the brush support jig 61 has a main body 62 which is formed of sheet metal (such as steel), i.e., is a single narrow elongated member having, for example, a rectangular cross-sectional shape. In the same way as for the first embodiment, the brush support jig 61 has a linear portion 62*a* having a coating of resin material on a coated portion 63 thereof. The linear portion 62*a* of the main body 62 and the coating portion 63 constitute the linear portion 61*a* of the brush support jig 61, and a tip portion 61*b* at the outer end, as shown.

The tip portion 62*c* of the linear portion 62*a* is curved in a U shape, by press forming, and hence the tip portion 63*a* of the coating portion 63 is also formed into a U shape, following the shape of the tip portion 62*c*. A grip portion 62*b* is formed at the rearward end of the linear portion 62*a*. The grip portion 62*b* is formed in a rectangular shape whose width is greater than that of the linear portion 62*a*, and greater than the width (or diameter) of the hole 33*b*. Hence, the grip portion 62*b* can be easily grasped by an operator, while in addition it can be ensured that the linear portion 61*a* cannot be inserted into the brush assembly 26 to an excessive extent.

It should be noted that the present invention is not limited to the embodiments described above, and that various alternative forms could be envisaged, which fall within the scope claimed for the invention.

For example, with the above embodiments the main bodies 52 and 62 are formed of a metal such as steel. However it would be equally possible to use some other material to form these, so long as the material has sufficient strength that the jig will not be deformed by the force applied via the brushes 28, 29 by the springs 44, 45.

Also in the above embodiments, the coated portions 53, 63 are formed of a resin material, however it would be equally possible to use another material such as rubber. The essential requirement is that the material must be of a type which cannot cause damage to the slip rings, i.e., that the material be of lower hardness than the slip rings.

Furthermore with the above embodiments, the linear portions 52*a*, 62*a* of the main bodies 52, 62 are entirely covered by the coating portions 53, 63 respectively. However it would be equally possible to form these coating portions only on the face of each main body which will become positioned opposite the slip rings 34, 35 when the brush assembly is mounted with the brush support jig inserted therein. Alternatively, it would be equally possible to form the coating portions 53, 63 such as to entirely cover not only the main bodies 52, 62 respectively, but also the grip portions 52*b*, 62*b*.

Moreover with the second embodiment, the main body 62 is formed from sheet metal, with a narrow pin configuration, i.e., is of flat shape. However it would be equally possible to make the main body of greater width along the peripheral direction, shaped such as to follow the peripheries of the slip rings 34, 35 and the lower ends of the brushes 28, 29, i.e., formed with a curved shape such as would result from cutting an elongated section of a cylindrical tube along the axial direction of the tube. It will be apparent that this would enable the main body to be made greater in width, without requiring that the spacing between the brush holder and the slip rings be increased.

Furthermore with the above embodiments, the brush support jigs 51, 61 are each supported at support regions constituted by the holes 33*b*, 33*d*. which are formed in the slip ring cover 33. However it would be equally possible to provide a greater number of support regions, formed in the brush holder 27 and/or in the slip ring cover 33.

What is claimed is:

1. A brush support jig for use when mounting a brush assembly of a rotary electric machine, the brush assembly including brushes which are in sliding contact with the outer peripheries of slip rings which are mounted on the shaft of the rotary electric machine, a brush holder for supporting the brushes with respect to the slip rings, and a slip ring cover which in conjunction with the brush holder surrounds the outer peripheries of the slip rings, the brush support jig being utilized prior to mounting the brush assembly around the periphery of the slip rings, for restraining the brushes from moving into a space which will become occupied by the slip rings, wherein the brush support jig comprises a combination of a first body and a second body, the second body being constituted by a material having a lower degree of hardness than the first body, and wherein the second body is formed at least upon a face of the first body which becomes positioned radially opposite the slip rings under a condition in which the brush assembly is mounted on the rotary electric machine.

2. A brush support jig according to claim 1, wherein the first body is formed of a metal and the second body is formed of a material selected from a group which includes resin material and rubber material.

3. A brush support jig according to claim 1, wherein the brush support jig is supported in a plurality of support regions which are formed in at least one of said brush holder and slip ring cover, and which are oriented mutually parallel and coaxial and aligned parallel to the axial direction of said rotary electric machine.

4. A brush support jig according to claim 3, wherein said support regions are respectively constituted by a plurality of holes which are formed in at least one of said brush holder and slip ring cover.

5. A brush support jig according to claim 1, wherein the brush support jig is formed with a limiter portion which limits the degree of insertion of the brush support jig into the brush assembly.

6. A brush support jig for use when mounting a brush assembly of a rotary electric machine, the brush assembly including brushes which are in sliding contact with the outer peripheries of slip rings which are mounted on the shaft of the rotary electric machine, a brush holder for supporting the brushes with respect to the slip rings, and a slip ring cover which in conjunction with the brush holder surrounds the outer peripheries of the slip rings, the brush support jig being utilized prior to mounting the brush assembly around the periphery of the slip rings, for restraining the brushes from moving into a space which will become occupied by the slip rings, wherein
- the brush support jig has at least a face thereof, which becomes positioned opposite the slip rings under a condition in which the brush assembly is mounted on the rotary electric machine, formed of a material which is of a lower degree of hardness than the slip rings,
- the brush support jig has a pin configuration, and
- a tip portion of the pin configuration is formed with a U-shaped contour.

7. A brush support jig according to claim 6,
wherein the brush support jig is formed of a metal wire body which is bent such as to have an elongated linear portion formed of two parallel lengths of metal wire and a tip portion which is bent into a U-shaped contour.

8. A brush support jig according to claim 7, comprising a coating of a material selected from a group including resin material and rubber material, formed over at least a face of said brush support jig which becomes positioned opposite the slip rings under said condition in which the brush assembly is mounted on the rotary electric machine.

9. A brush support jig according to claim 7, wherein said metal wire body comprises at least one outer end portion, located at the opposite end of said linear portion from said tip portion, that is bent into a U-shape configuration which is of opposite orientation to that of said tip portion, and wherein said outer end portion functions as a limiter portion for limiting an extent to which said brush support jig can be inserted into said brush assembly.

10. A brush support jig according to claim 6,
wherein the brush support jig is formed of a sheet metal body having an elongated linear portion, said linear portion having a tip portion thereof configured with a U-shaped contour.

11. A brush support jig according to claim 10, comprising a coating of a material selected from a group including resin material and rubber material, formed over at least a face of said brush support jig which becomes positioned opposite the slip rings under said condition in which the brush assembly is mounted on the rotary electric machine.

12. A brush support jig according to claim 10, wherein said sheet metal body comprises a grip portion located at the opposite end of said linear portion from said tip portion, and wherein said grip portion has a width which is substantially greater than the width of said linear portion, for thereby functioning as a limiter portion for limiting an extent to which said brush support jig can be inserted into said brush assembly.

* * * * *